(12) United States Patent
Cheng

(10) Patent No.: US 6,745,352 B2
(45) Date of Patent: Jun. 1, 2004

(54) METHODS OF ESTIMATING ERROR RATES FOR COMMUNICATIONS RECEIVED USING ITERATIVE PROCESSING AND RELATED RECEIVERS

(75) Inventor: Jung-Fu Cheng, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 448 days.

(21) Appl. No.: 09/736,761

(22) Filed: Dec. 13, 2000

(65) Prior Publication Data

US 2002/0099985 A1 Jul. 25, 2002

(51) Int. Cl.[7] .................................. G06F 11/00
(52) U.S. Cl. ........................ 714/704; 375/262
(58) Field of Search .................... 714/704; 375/262; 370/242, 332, 333; 398/27

(56) References Cited

U.S. PATENT DOCUMENTS

| 5,446,747 A | 8/1995 | Berrou | 371/45 |
| 5,761,248 A | 6/1998 | Hagenauer et al. | 375/340 |
| 6,487,255 B1 * | 11/2002 | Arslan et al. | 375/262 |

FOREIGN PATENT DOCUMENTS

| EP | 0 982 874 A2 | 3/2000 | |
| WO | WO 90/14721 * | 11/1990 | H04H/1/00 |

OTHER PUBLICATIONS

Kawai H. et al; *Outer–loop control of target SIR for fast transmit power control in turbo–coded W–CDMA mobile radio*; Electronics Letters, IEE Stevenage, GB, vol. 35, No. 9; Apr. 29, 1999 pp 699–701.

Shibutani A. et al; *Reducing average number of turbo decoding iterations*, Electronics Letters, IEE Stevenage, GB. vol. 35, No. 9; Apr. 29, 1999 pp 701–702.

Jung–Fu Cheng; *Turbo decoder assisted frame error rate estimation*; IEEE 54th Vehicular Technology Conference, VTC Fall 2001 pp 2492–2496.

International Search Report of PCT/US 01/44204.

C. Berrou et al; *Near Shannon Limit Error—Correcting Coding and Decoding: Turbo–Codes (1)*; pp 1064–1070.

S. Benedetto et al; *Serial Concatenation of Interleaved Codes: Performance Analysis, Design, and Iterative Decoding*; IEEE Transactions of Information Theory vol. 44, No. 3 (May 1998) pp 909–926.

A. Picart et al; *Turbo–Detection: A New Approach to Combat Channel Frequency Selectivity*; IEEE (1997) pp 1498–1502.

P. Robertson et al; *A Comparison of Optimal and Sub–Optimal MAP Decoding Algorithms Operating in the Log Domain*; IEEE (1995) pp 1009–1013.

P. Strauch et al; *Turbo Equalization for an 8–PSK Modulation Scheme in a Mobile TDMA Communication System*; VTC (1999) pp 1605–1609.

L.R. Bahl et al; *Optimal Decoding of Linear Codes for Minimizing Symbol Error Rate*; IEEE Transactions on Information Theory, Mar. (1974) 284–287.

(List continued on next page.)

*Primary Examiner*—Albert Decady
*Assistant Examiner*—Dipakkumar Gandhi
(74) *Attorney, Agent, or Firm*—Myers Bigel Sibley & Sajovec

(57) ABSTRACT

Estimating an error rate for received communications can include iteratively processing each of a plurality of received symbol sequences to provide a respective plurality of data sequences, and providing a number of iterations performed to provide each of the plurality of data sequences. An error rate for the received communications can then be estimated based on the number of iterations performed to provide each of the plurality of data sequences. Related receivers and communications devices are also discussed.

27 Claims, 15 Drawing Sheets

OTHER PUBLICATIONS

J. Cheng; *Linearly Approximated Log–MAP Algorithms for Turbo Decoding*; VTC 2000; pp 2252–2256.

A. Shibutani et al; *Complexity Reduction of Turbo Decoding*; VTC (1999) pp 1570–1574.

R. Shao et al; *Two Simple Stopping Criteria for Iterative Decoding*; IEEE (1998) pp 279.

K. R. Narayanan et al; *A Serial Concatenation Approach to Iterative Demodulation and Decoding*; IEEE Transaction of Communications, vol. 47, No. 7 (Jul. 1999) pp 956–961.

* cited by examiner

| Average Number of Iterations | log10(Operating FER) |
|---|---|
| 7.97 | $-8.77e-03$ |
| 7.67 | $-5.79e-02$ |
| 7.43 | $-9.09e-02$ |
| 6.23 | $-2.92e-01$ |
| 5.92 | $-4.07e-01$ |
| 5.00 | $-6.59e-01$ |
| 4.17 | $-9.51e-01$ |
| 3.48 | $-1.32e+00$ |
| 2.92 | $-1.89e+00$ |
| 2.57 | $-2.42e+00$ |
| 2.31 | $-3.23e+00$ |
| 2.14 | $-4.00e+00$ |
| 2.02 | $-4.09e+00$ |
| 1.91 | $-4.39e+00$ |

FIG. 7.

| Frame Number | Operating $E_b/N_o$ | Operating FER |
|---|---|---|
| 1-2000 | 1.2dB | 1% |
| 2001-4000 | 1.48dB | 0.1% |
| 4001-6000 | 1.2dB | 1% |
| 6001-8000 | 0.9dB | 10% |
| 8001-10000 | 1.2dB | 1% |

METHODS OF ESTIMATING ERROR RATES FOR COMMUNICATIONS RECEIVED USING ITERATIVE PROCESSING AND RELATED RECEIVERS

BACKGROUND OF THE INVENTION

The present invention relates to the field of communications and more particularly to methods of estimating error rates and related receivers.

In digital communications systems, such as a radiotelephone communications system, a quality of service may be specified in terms of an average frame error rate (FER) or average bit error rate (BER) for information frames received. To maintain a desired quality of service, a transmitter (for either a mobile terminal or a base station) may vary a transmission power level and/or channel/source coding method to accommodate, for example, a desired quality of service, variations in system loading (number of mobile terminals being serviced), and/or variations in channel conditions. An estimation of an error rate for communications received at a receiving device can, thus, be calculated, provided to a transmitting device, and used to vary transmission power.

An error rate can be estimated by averaging a number of bits or frames that fail a cyclic redundancy check. Such an approach, however, may provide a relatively low convergent speed. If an operating frame error rate is 1%, for example, a statistically reliable frame error rate may require observation of at least several hundred frames. During this period, channel conditions could change significantly, which could make responsive adaptation difficult to achieve.

SUMMARY OF THE INVENTION

According to embodiments of the present invention, an error rate for received communications can be estimated. In particular, each of a plurality of received symbol sequences can be iteratively processed to provide a respective plurality of data sequences, and a number of iterations performed to provide each of the plurality of data sequences can be provided. An error rate for the received communications can be estimated based on the number of iterations performed to provide each of the plurality of data sequences.

BRIEF DESCRIPTION OF THE DRAWINGS

FIG. 7 illustrates embodiments of look-up tables according to the present invention.

FIG. 8 is a table illustrating operating conditions for simulations of FIGS. 19–22.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by those of skill in the art, the present invention may be embodied as methods or devices. Accordingly, the present invention may take the form of a hardware embodiment, a software embodiment or an embodiment combining software and hardware aspects. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 1:
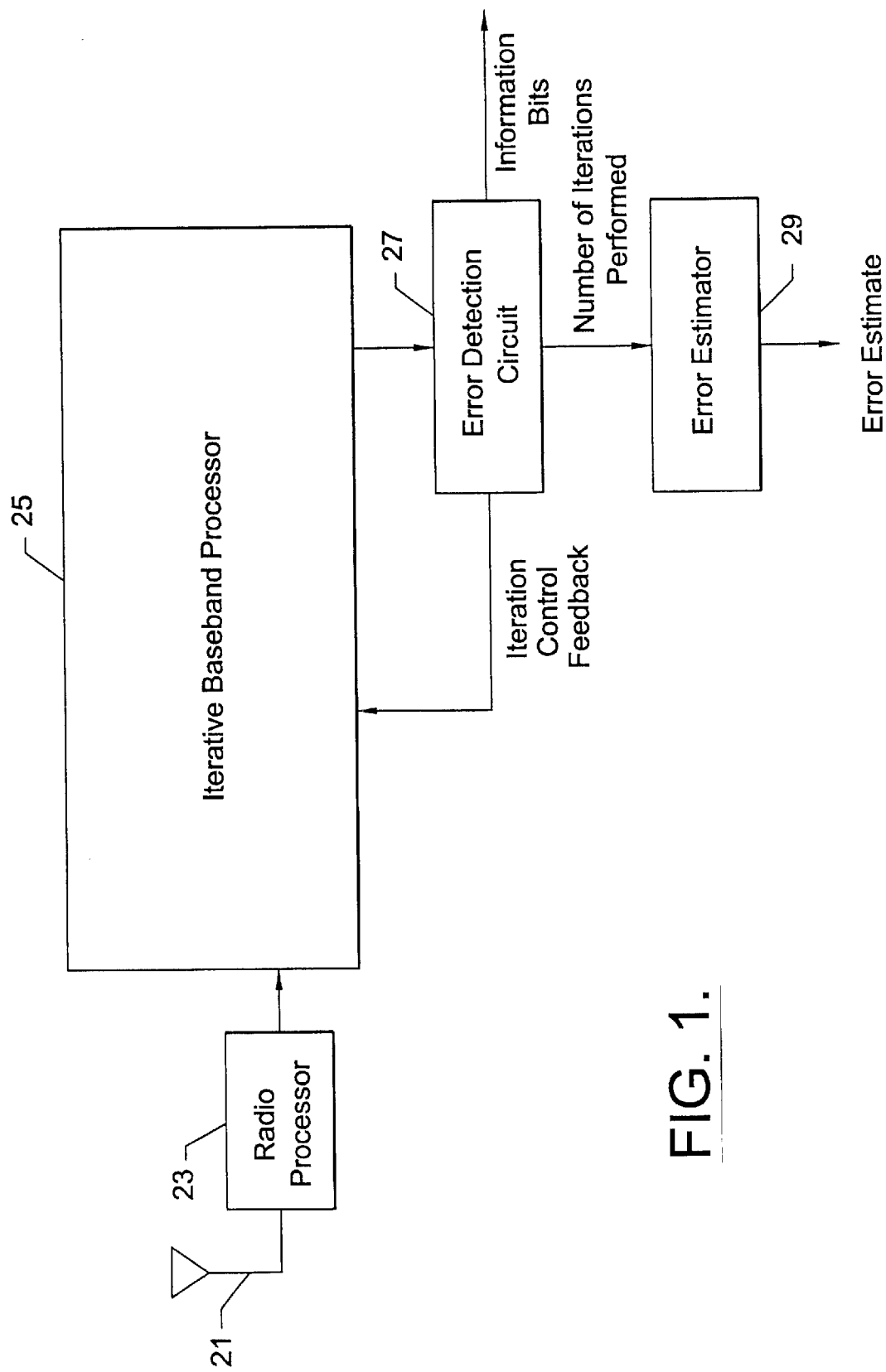
FIGS. 1 and 2 are block diagrams illustrating embodiments of receivers and methods according to the present invention.

As illustrated in the block diagram of FIG. 1, a receiver according to the present invention can include an antenna 21, a radio processor 23, an iterative baseband processor 25, an error detection circuit 27, and an error estimator 29. The radio processor generates soft values at a symbol rate for the communications being received, and the iterative baseband processor decodes the soft values using iterative processing techniques.

Figure 2:
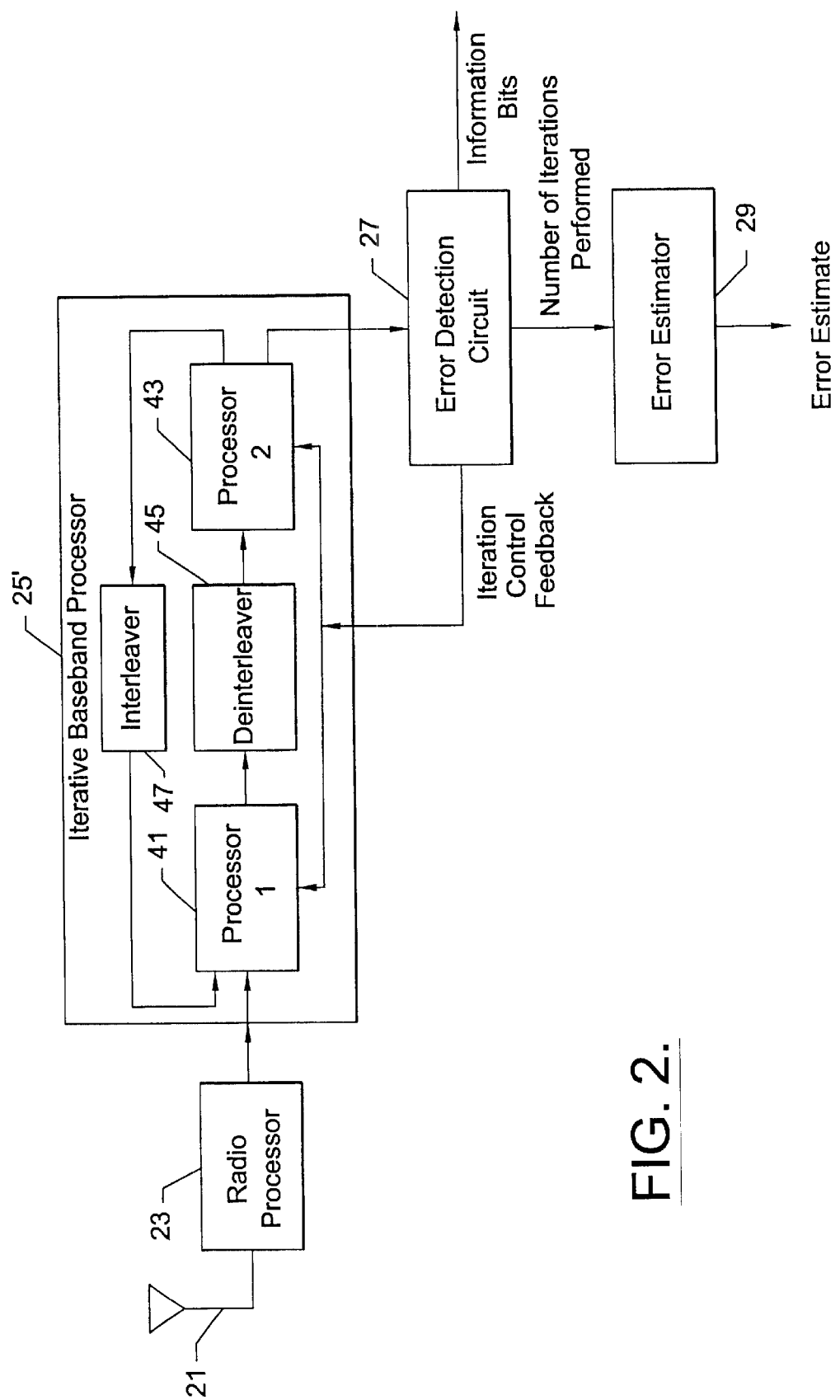

A second example of a receiver according to the present invention is illustrated in FIG. 2 wherein the iterative baseband processor 25' includes a first processor 41, a second processor 43, a deinterleaver 45, and an interleaver 47. As with the receiver of FIG. 1, the receiver of FIG. 2 also includes an antenna 21, a radio processor 23, an error detection circuit 27, and an error estimator 29. The baseband processor 25', for example, can be a turbo decoder wherein the first and second processors 41 and 43 can be respective first and second map decoders. Alternately, the baseband processor 25' can be a turbo equalizer wherein the first processor 43 is an equalizer, and the second processor 45 is a map decoder.

The iterative baseband processor 25, for example, can be a turbo decoder for a parellel concatenated convolutional code as discussed, for example, by Claude Berrou et al. in the reference entitled "Near Shannon Limit Error-Correcting Coding And Decoding: Turbo-Codes", *IEEE International Conference On Communications Conference ICC '93*, May 23–26, 1993, pp. 1064–1070, the disclosure of which is incorporated herein in its entirety by reference. A turbo decoding algorithm can use soft-input soft-output (SISO) modules to iteratively process component codes. Alternate iterative baseband processors, for example, include iterative decoders for serially concatenated codes (Sergio Benedetto et al., "Serial Concatenation Of Interleaved Codes; Performance Analysis, Design, and Iterative Decoding", *IEEE Transactions On Information Theory*, Vol. 44, No. May 3, 1998, pp. 909–926); iterative demodulation and decoding algorithms for coded differential modulation (Krishna R. Narayanan et al., "A Serial Concatenation Approach To Iterative Demodulation And Decoding", *IEEE Transactions On Communications*, Vol. 47, No. 7, July 1999, pp. 956–961); and iterative equalization and decoding algorithms for coded multipath channels (Annie Picart et al., "Turbo-Detection: A New Approach To Combat Channel Frequency Selectivity", *Proceedings Of IEEE International Communications Conference* '97, pp. 1498–1502, 1997). The disclosures of each of the above cited references are incorporated herein in their entirety by reference.

A common aspect of iterative baseband processors is that average operational complexity (and power consumption) can be significantly reduced without degrading performance by terminating iterative processing for a received frame when the resulting data passes error detection/correction. A turbo decoder, for example, may be designed to execute 8 iterations for a certain operating point. Error free decoding, however, may be achieved for many data frames after only 2 or 3 iterations of the iterative baseband processor. Additional iterations may only be needed for rare events when a frame is received with a significant amount of noise and the iterative baseband processor converges relatively slowly.

Accordingly, the error detection circuit 27 can be used to detect the correctness of the estimated data sequence generated by the iterative baseband processor 25, and to abort subsequent iterative processing for a received data frame if the estimated data sequence passes error detection (or can be corrected) using error detection techniques, such as a cyclical redundancy check. In other words, iterative processing for a symbol sequence may be aborted when the correct data sequence (such as a data frame) can be provided. This may reduce an average operational complexity without reducing performance. The termination of iterative processing for a symbol sequence upon detection of a correct estimated data sequence is discussed, for example, by Rose Y. Shao et al., "Two Simple Stopping Criteria For Iterative Decoding", *Proceedings Of IEEE International Symposium On Information Theory* '98, p. 279, August 16–21, 1998; by Joachim Hagenauer et al., U.S. Pat. No. 5,761,248 entitled "Method And Arrangement For Determining An Adaptive Abort Criterion In Iterative Decoding Of Multi-Dimensionally Coded Information, Issued Jun. 2, 1998; and by Akira Shibutani et al., "Complexity Reduction Of Turbo Decoding", *Proceedings Of IEEE Vehicular Technology Conference* '00 Fall, October 1999, pp. 1570–1574. The disclosures of each of the above cited references are incorporated herein in their entirety by reference.

Iterative processing can be aborted, for example, using cyclic redundancy check (CRC) bits that are provided in data frames for many communications systems. According to this example, CRC bits are embedded in each data frame, and the CRC checksum can be computed at the end of each iteration. The CRC code can, thus, be used to indicate when the iterative processor has generated the correct data sequence for the data frame, and this indication can be used to abort subsequent iterative processing for the data frame, thereby potentially reducing iterative operations performed.

Upon detection of a correct data sequence, the error detection circuit 27 provides iteration control feedback to the iterative baseband processor 25 that instructs the iterative baseband processor to abort iterative processing for the symbol sequence, and the error detection circuit 27 passes the correct data sequence as information bits for use in the communications device. The error detection circuit also passes the number of processing iterations performed to generate the correct data sequence to the error estimator 29, where the number of processing iterations performed can be used to calculate an estimate of an error rate for the received communications.

For example, an average of the number of processing iterations used to generate a predetermined number of successive correct data sequences can be used to estimate an error rate. In particular, the error estimator can rely on the finding that an average number of processing iterations is typically strongly correlated to an operating frame error rate (FER) and a bit error rate (BER). This correlation is illustrated in FIGS. 3A–B and 4A–B for receivers according to the present invention, including wideband-CDMA (W-CDMA) turbo decoders.

Figure 3A:
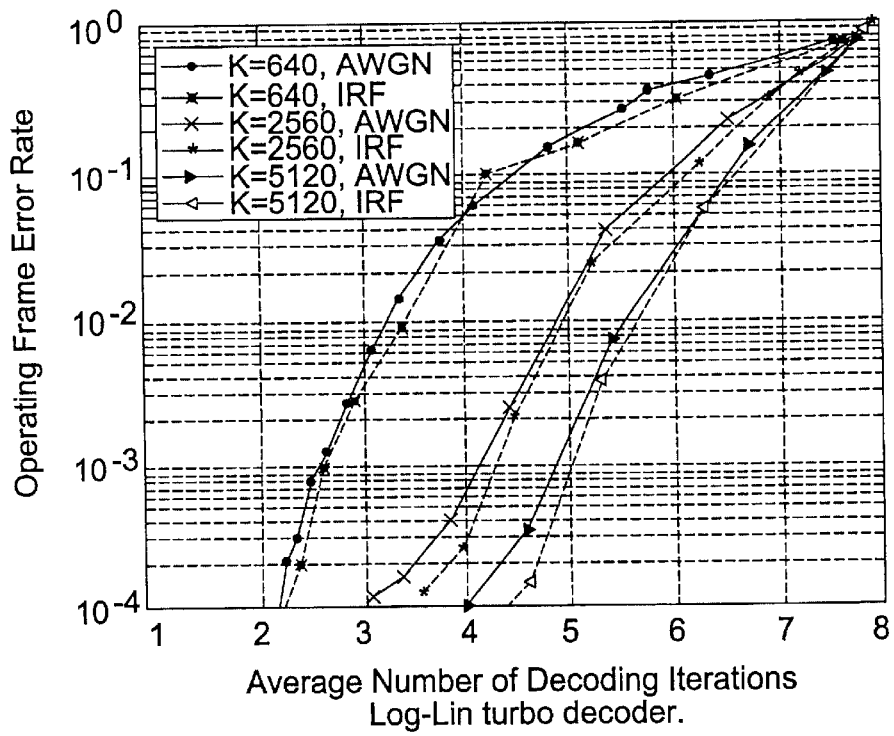
FIGS. 3A–B and 4A–B are graphs illustrating correlations between error rates and processor iterations according to embodiments of the present invention.
Figure 3B:
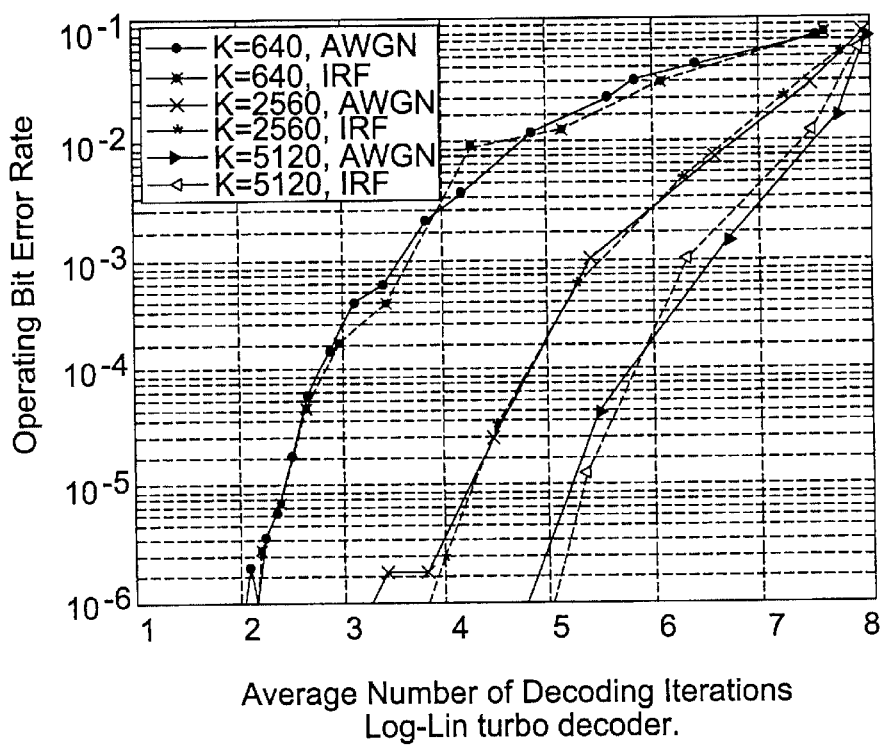

With respect to FIGS. 3A–B, a correlation between operating bit and frame error rates and an average number of decoding iterations is illustrated for a W-CDMA receiver including a Log-Lin turbo decoder for the iterative baseband processor 25. An example of a Log-Lin turbo decoder is discussed, for example, by Jung-Fu Cheng et al. in the referenced entitled "Linearly Approximated Log-Map Algorithms For Turbo Decoding", *Proceedings Of IEEE Vehicular Technology Conference* '00 Spring, May, 2000, pp. 2252–2256, the disclosure of which is hereby incorporated herein in its entirety by reference. In FIG. 3A, the operating frame error rate (FER) for the Log-Lin turbo decoder is plotted against the average number of decoding iterations per data frame for two different channel models and three different data frame sizes K (K=number of bits in a data frame). The two different channel models are additive white Gaussian noise (AWGN) and independent Rayleigh fading (IRF) channels. In FIG. 3B, the operating bit error rate (BER) for the Log-Lin turbo decoder is plotted against the average number of decoding iterations per data frame for the two different channel models and three different frame sizes.

Figure 4A:
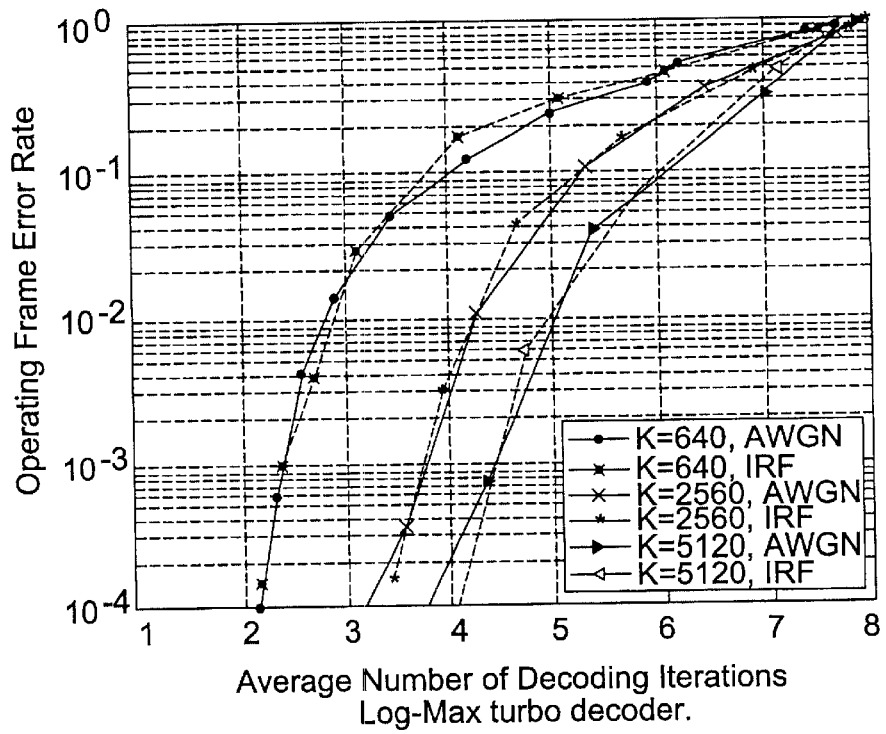
Figure 4B:
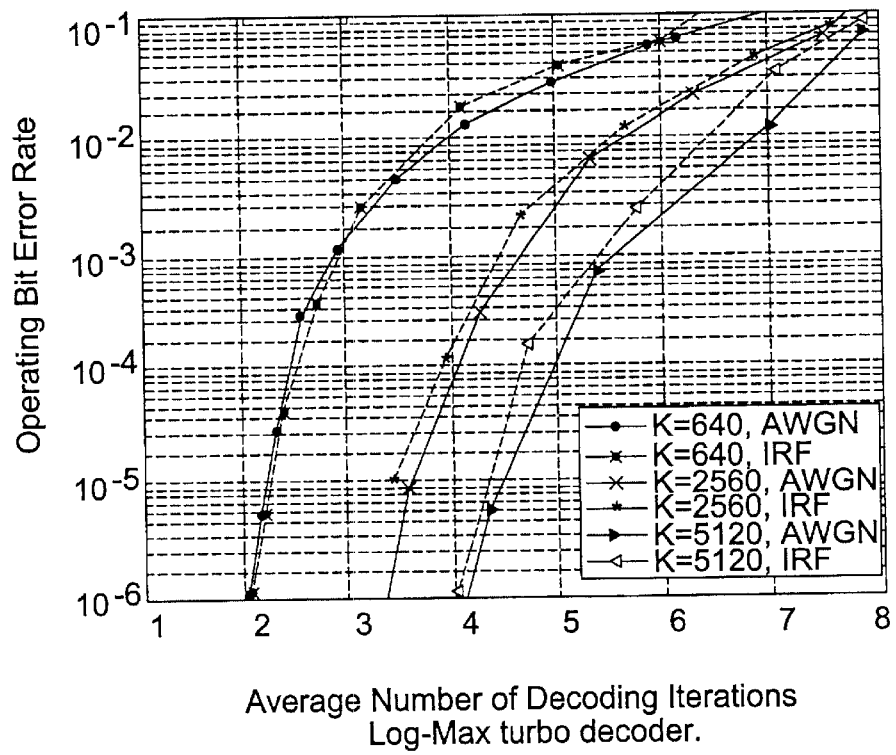

With respect to FIGS. 4A–B, a correlation between operating error rates and an average number of decoding iterations is illustrated for a W-CDMA receiver including a Log-Max turbo decoder for the iterative baseband processor 25. An example of a Log-Max turbo decoder is discussed, for example, by Patrick Robertson et al. in the reference entitled "A Comparison Of Optimal And Sub-Optimal MAP Decoding Algorithms Operating In The Log Domain", *Proceedings Of IEEE International Communications Conference* '95, June 1995, pp. 1009–1013, the disclosure of which is hereby incorporated herein in its entirety by reference. In FIG. 4A, the operating frame error rate (FER) for the Log-Max turbo decoder is plotted against the average number of decoding iterations per data frame for two different channel models and three different data frame sizes K (K=number of bits in a data frame). The two different channel models are additive white Gaussian noise (AWGN) and independent Rayleigh fading (IRF) channels. In FIG. 4B, the operating bit error rate (BER) for the Log-Max turbo decoder is plotted against the average number of decoding iterations per data frame for the two different channel models and three different frame sizes.

While a correlation of error rates with respect to average numbers of decoding iterations has been discussed above with respect to receivers including Log-Lin and Log-Max turbo decoders, these iterative decoders have been discussed by way of example, and methods and receivers according to the present invention can be implemented using other iterative baseband processors and/or iterative baseband processing techniques. For an iterative baseband processor implementation and a given data frame size K, a reliable relationship between an average number of baseband processing iterations and an operating bit and/or frame error rate can thus be determined. Moreover, FIGS. 3A–B and 4A–B show that the relationship between the operating error rate and the average number of decoding iterations may not be significantly affected by the choice of channel models.

Figure 5:
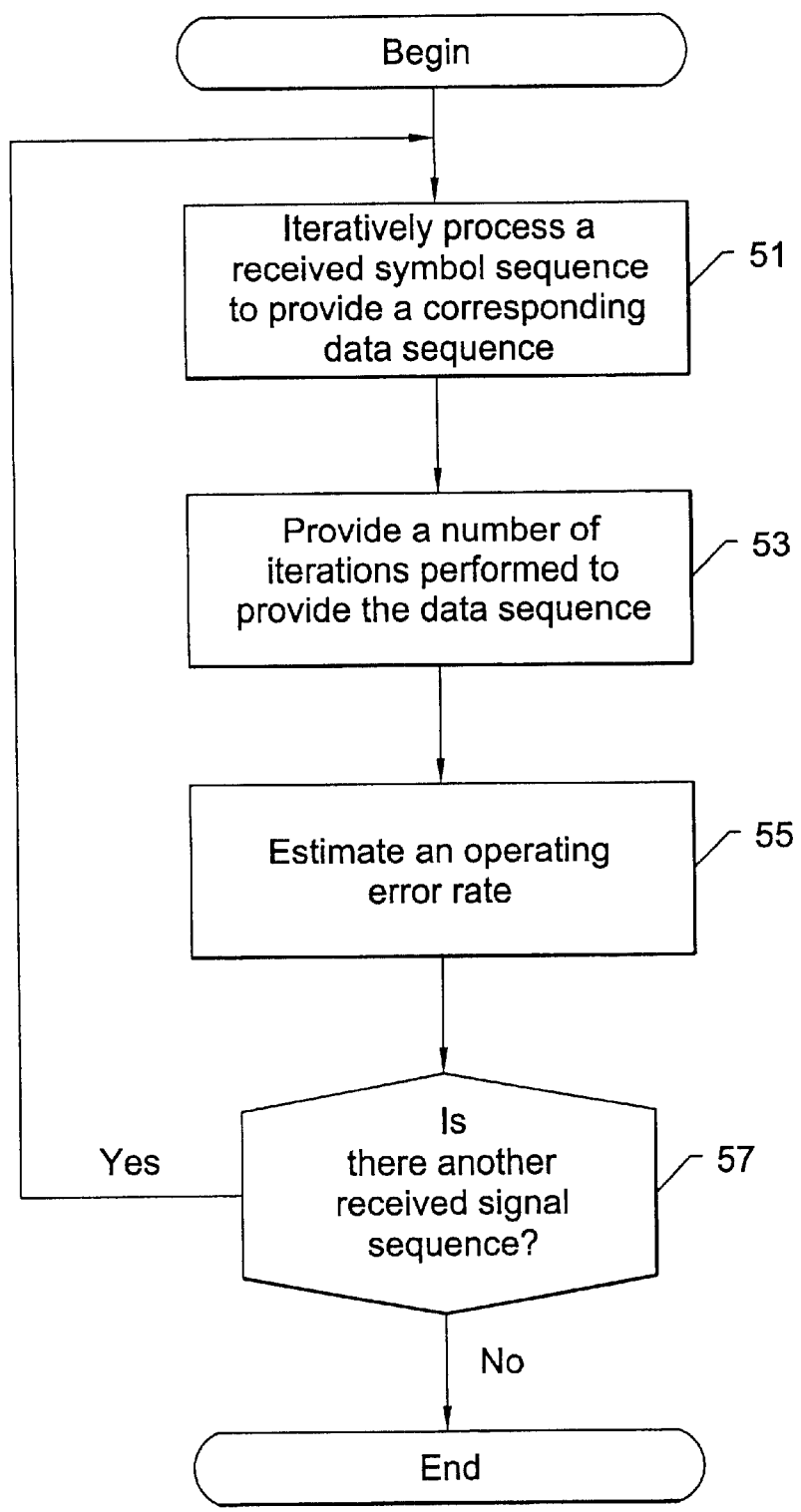
FIGS. 5 and 6 are flow charts illustrating operations of receivers and methods according to embodiments of the present invention.

An example of operations of the receiver of FIG. 1 are illustrated in the flow chart of FIG. 5. As discussed above, the receiver iteratively processes each of a plurality of successive received symbol sequences to provide a respective plurality of data sequences (such as data frames) at block 51. For each data sequence provided, a number of iterations performed to provide the data sequence is provided at block 53, and the number of iterations performed is used to estimate an error rate for received communications at block 55. For example, an average number of iterations performed can be calculated using the most recently recorded number of iterations together with previous number(s) of iterations performed for previous data sequences, and the average can be used to estimate the error rate using data, such as that provided in FIGS. 3A–B and 4A–B. The operations of FIG. 5 can be repeated for additional received signal sequences at decision block 57.

Figure 6:
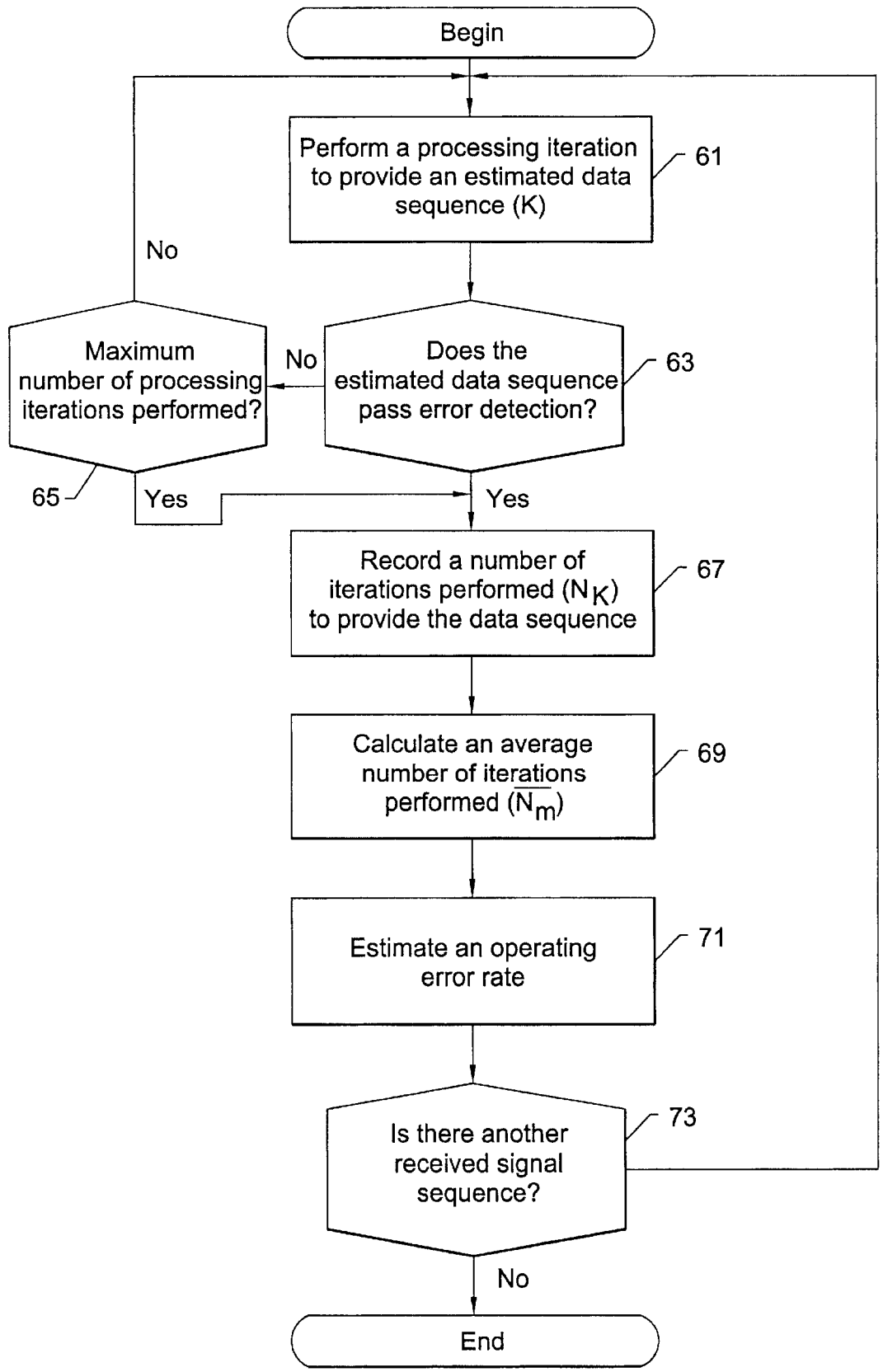

Alternate examples of operations of the receiver of FIG. 1 are illustrated in FIG. 6. In particular, the iterative baseband processor 25 iteratively processes a received symbol sequence to provide an estimated data sequence at the end of each iteration at block 61. The error detection circuit 27 performs an error check on the estimated data sequence at the end of each processing iteration. If the data sequence fails the error check at decision block 63 and a maximum number of processing iterations have not been performed for the received signal sequence at decision block 65, the iterative baseband processor 25 performs a subsequent processing iteration at block 61 to provide a subsequent estimated data sequence. Iterative processing for the received signal sequence is, thus, repeated responsive to iteration control feedback until either an estimated data sequence passes error detection at decision block 63 or the maximum number of processing iterations have been performed as indicated at decision block 65.

Upon completion of iterative processing for a received symbol sequence (identified as signal sequence m), a number of processing iterations $N_m$ performed to generate the final estimated data sequence m is recorded at block 67. The estimated data sequence m can also be passed as information bits (such as a data frame) as shown in FIG. 1. In the event that block 67 was reached when the maximum number of processing iterations were performed without passing error detection, $N_m$ can be the maximum number of processing iterations and the final estimated data sequence m can be passed as data bits. Alternately, $N_m$ can be ignored if the final estimated data sequence does not pass error detection, and/or the final estimated data sequence can be discarded.

The number of processing iterations $N_m$ for the most recent estimated data sequence m can then be used to update an average number of processing iterations performed $\overline{N_m}$ at block 69. The average number of processing iterations performed can be calculated, for example, using averaging techniques, such as sliding window averaging or exponential forgetting averaging. When using sliding window averaging, the error estimator 29 keeps a list of the past L provided number of processing iterations $N_m, N_{m-1} \ldots, N_{m-L+1}$, and the current average of processing iterations can be calculated as:

$$\overline{N_m} = \frac{1}{L}\sum_{l=0}^{L-1} N_{m-1}.$$ Equation 1.

When exponential forgetting averaging is used, the error estimator 29 can combine the previous average number of processing iterations $\overline{N_{m-1}}$ with the current number of processing iterations $N_m$ using an exponential forgetting factor $0<\alpha<1$ such that:

$$\overline{N_m} = (1-\alpha)N_m + \alpha\overline{N_{m-1}}$$ Equation 2.

Using exponential forgetting averaging, a list of past reported numbers of processing iterations $N_m, N_{m-1} \ldots, N_{m-L+1}$ is thus not required. While sliding window averaging and exponential forgetting averaging are discussed by way of example, other averaging techniques could be used.

An operating frame error rate (FER) and/or bit error rate (BER) can then be estimated by the error estimator 29 at block 71 using the average number of iterations performed $\overline{N_m}$. In particular, the operating FER and/or BER can be estimated using the average number of iterations performed together with a relationship with respect to error rated illustrated graphically, for example, in FIGS. 3A–B and 4A–B. The relationships illustrated graphically in FIGS. 3A–B and 4A–B can be stored in memory available to the error estimator 29 as look-up tables or as appropriate mathematical relationships or functions. The relationships between the average number of iterations performed and the error rates may be dependent on the implementation of the iterative baseband processor used, a number of bits in a data sequence (i.e., data frame size K), the channel models used, and/or other factors, and multiple relationships (i.e. look-up tables or mathematical functions) may be provided to accommodate different operating conditions. Moreover, the relationships between the average number of iterations performed and the error rate can be trained over time and/or updated online.

The estimate of the error rate can then be transmitted to the radio device transmitting the communications being received and used to adjust a transmit power for the communications being received by the receiver of FIG. 1. An increase in the error rate for communications received by the receiver of FIG. 1 may indicate a need to transmit the communications from the other radio device at a higher power to reduce the error rate for communications received by the receiver of FIG. 1. Alternately, a decrease in the error rate for communications received by the receiver of FIG. 1 may indicate that the other radio device can transmit at a lower power. The receiver of FIG. 1 can then proceed with iterative processing of a subsequent received symbol sequence if there is a subsequent received symbol sequence as indicated at decision block 73.

According to the present invention, a number of iterative baseband processing iterations performed for each received symbol sequence can be used to estimate an error rate for received communications. Error rate estimates can, thus, be updated for each frame received, and the granularity of each updated error estimate can be greater than one. In other words, the number of iterative baseband processing iterations performed for each received symbol sequence can vary between 1 and the maximum number of processing iterations allowed. In addition, a statistically reliable error rate estimate may be obtained observing a relatively low number of processed frames.

In one example of a receiver according to the present invention, the iterative baseband processor 25 can be a Log-Max decoder with a data frame size of K=640 and a maximum number of iterations equal to 8 that, for the purposes of this explanation, is presumed to be currently operating at a frame error rate (FER) of 0.01. As shown in FIG. 4A, the corresponding average number of decoding iterations for each data frame is approximately 3. Using error estimation methods according to embodiments of the present invention, observations of as few as 20 data frames may be used to generate a reliable frame error rate estimation given that the number of decoding iterations may be observed for every frame, whether the frame is in error or not. This performance may be obtained where a measurement (i.e. a number of iterations) is provided for each frame, and each measurement has a granularity of 8 (the maximum number of iterations). In contrast, conventional error estimators may rely on observations of actual bit/frame errors and may need to observe on the order of at least several hundred frames to get a reliable frame error rate estimation at FER=0.01.

Simulation results will be discussed with reference to FIGS. 9, 10, 17, 18, and 19 for a W-CDMA turbo code receiver according to embodiments of the present invention receiving 10,000 data frames where the iterative baseband processor is a Log-Max decoder with a data frame size of K=640 and using sliding window averaging. The relationship between frame error rate and average number of decoding iterations for this W-CDMA receiver is illustrated in FIG. 4A, and the curve for K=640 is converted to numerical data in the look-up table of FIG. 7. After calculating the average number of processing iterations used to generate a correct data sequence, as discussed above with regard to FIG. 6, and using sliding window averaging, an estimate of the frame error rate can be obtained from the look-up table of FIG. 7 using, for example, linear interpolation of the actual average number of iterations.

Comparative simulation results will be discussed with reference to FIGS. 11, 12, 13, 14, 15, 16, 20, 21, and 22 for a receiver using conventional error estimation techniques. In particular, the conventional receiver typically calculates a frame error rate by observing a predetermined number of decoded data frames, counting a number of the data frames in error, and dividing the number of errors by the predetermined number of decoded data frames, to provide a frame error rate. As will be shown, conventional error estimates can be made more reliable for a receiver experiencing a constant frame error rate by observing a large predetermined number of data frames. Such an estimate, however, may not adequately adapt to conditions were the frame error rate changes rapidly relative to the frame period.

In FIGS. 9–18 simulation results are presented for receivers subject to constant signal-to-noise ratios (SNR) for the duration of the 10,000 frames received. In particular, these simulations use a constant operating $E_b/N_0$ simulated at 0.9 dB, 1.2 dB, and 1.48 dB with corresponding frame error rates of 0.1014, 0.0111, and 0.0013, respectively. FIGS. 9, 11, 13, 15, and 17 are provided on a log-log scale to illustrate initial convergence speeds. FIGS. 10, 12, 14, 16, and 18–22 are provided on a semilog scale to illustrate long term variation.

In FIGS. 19–22, simulation results are presented for receivers subject to varying signal-to-noise ratios for the duration of the 10,000 frames received. The table of FIG. 8 identifies the operating $E_b/N_0$ and operating frame error rate simulated for each group of frames within the 10,000 frames of the simulation. In particular, a frame error rate of 1% is simulated for frames 1–2000, 4001–6000, and 8001–10000; a frame error rate of 0.1% is simulated for frames 2001–4000; and a frame error rate of 10% is simulated for frames 6001–8000.

Figure 9:
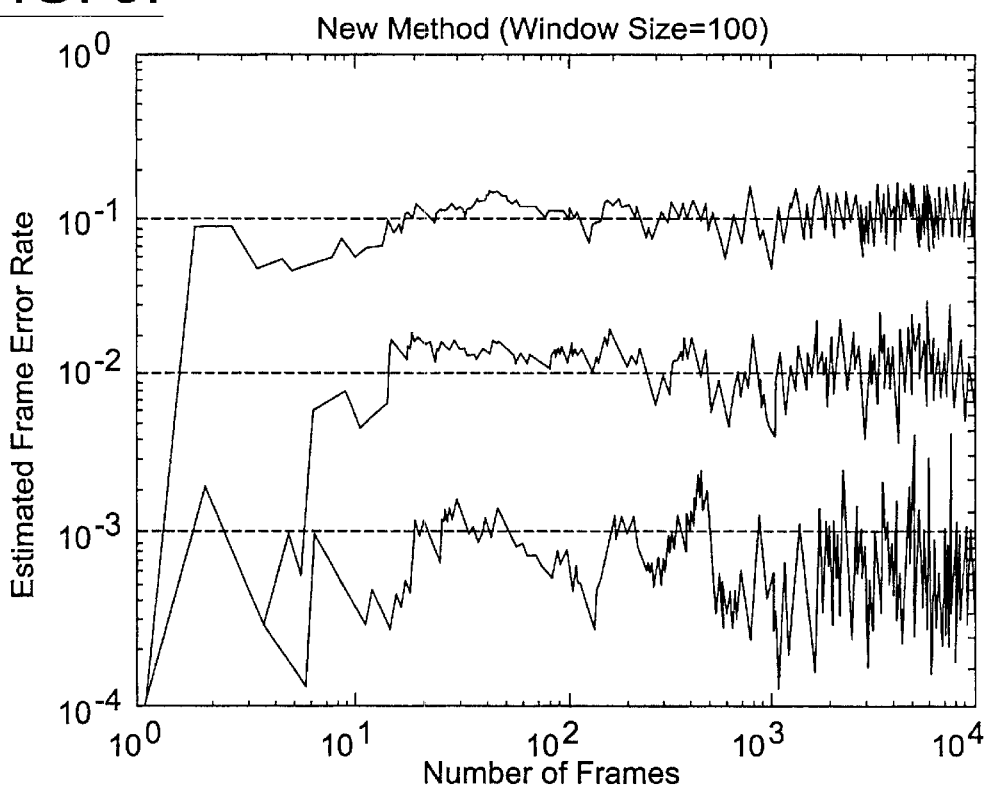
FIGS. 9, 10, 17, 18, and 19 illustrate simulations of receivers and methods according to the present invention.
Figure 10:
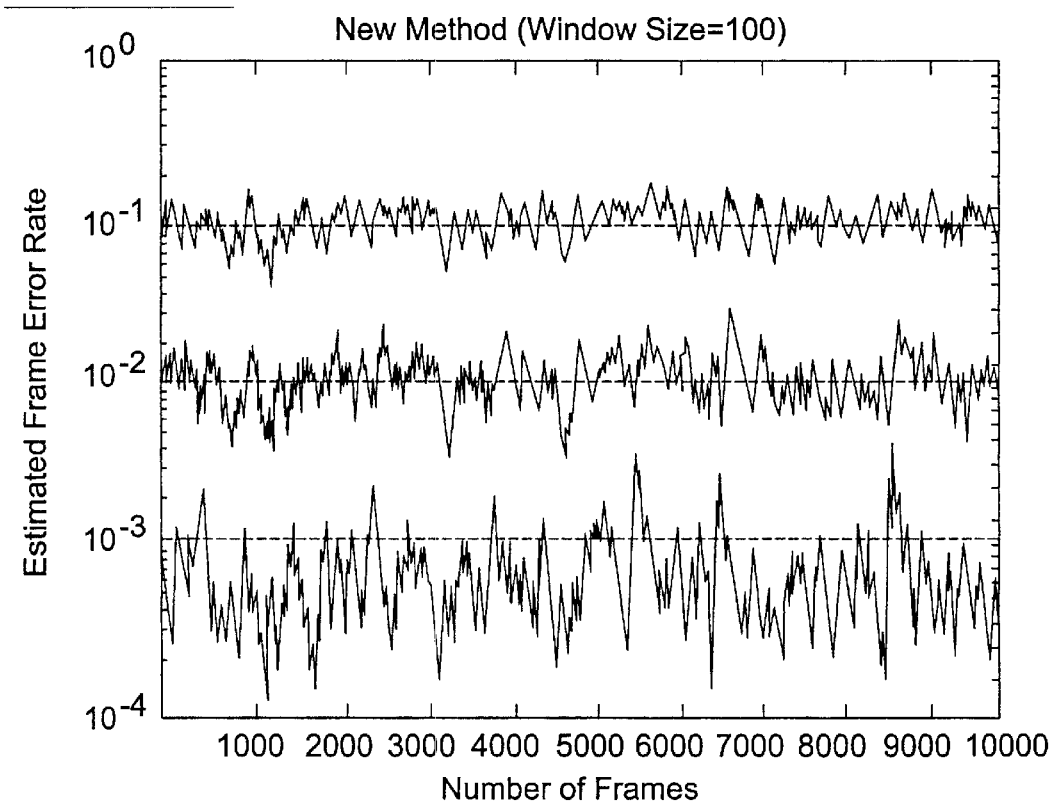

FIGS. 9 and 10 illustrate simulation results for a WCDMA turbo code receiver (using Log-Max decoder and frame size K=640 with sliding window averaging) according to embodiments of the present invention performed with three constant operating $E_b/N_0$ and frame error rates, and performed with a sliding window averaging size L of 100 frames. As shown in FIG. 9, reliable estimates of the frame error rates can be obtained within approximately 30 frames at all three error rates. The long term estimates of the frame error rates are also reliable as shown in FIG. 10. In particular, the long term estimates of the frame error rates at 10% and 1% are approximately centered with respect to the actual frame error rates. The estimate for an actual frame error rate of 0.1% appears to be centered slightly lower than the actual frame error rate. This may be a result of the relatively low sampling resolution in the table of FIG. 7 taken from the steep slope portion of the graph of FIG. 4B.

Figure 11:
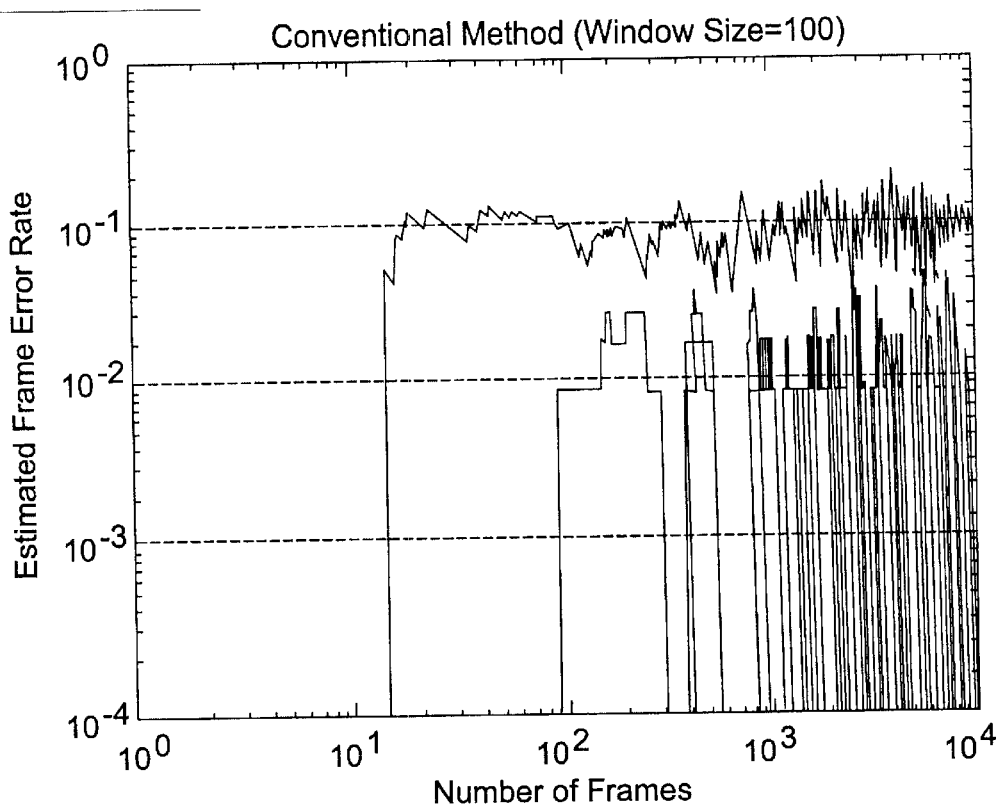
FIGS. 11, 12, 13, 14, 15, 16, 20, 21, and 22 graphically illustrate simulations of conventional receivers.
Figure 12:
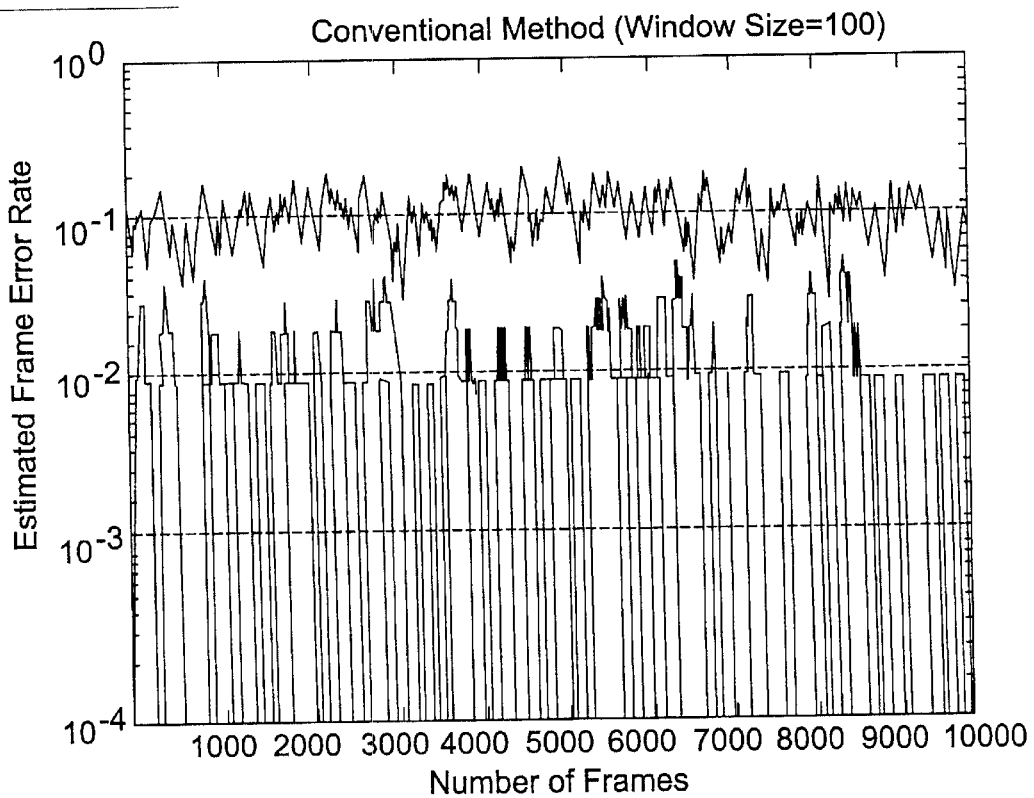

FIGS. 11 and 12 illustrate simulation results for a conventional receiver corresponding to the results of FIGS. 9 and 10 and using a window size of 100 frames. In other words, the estimate of the frame error rate is conventionally calculated by observing the most recent 100 frames, counting the number of frame errors, and dividing the number of frame errors by the number of frames observed. As shown, no reliable estimate of the frame error rate is provided until at least 1/(actual FER) frames have been observed. As shown, a reliable estimate of the frame error rate can be obtained for FER=10% after approximately 20 frames. The estimate of the frame error rate for FER=1% is not very reliable and can only occasionally provide estimates because there will be some 100 frame windows with no frame errors resulting in an estimated frame error rate of 0 for those estimates. At an actual FER of 0.1%, the simulation of conventional error estimation does not appear to work at all in this simulation.

Figure 13:
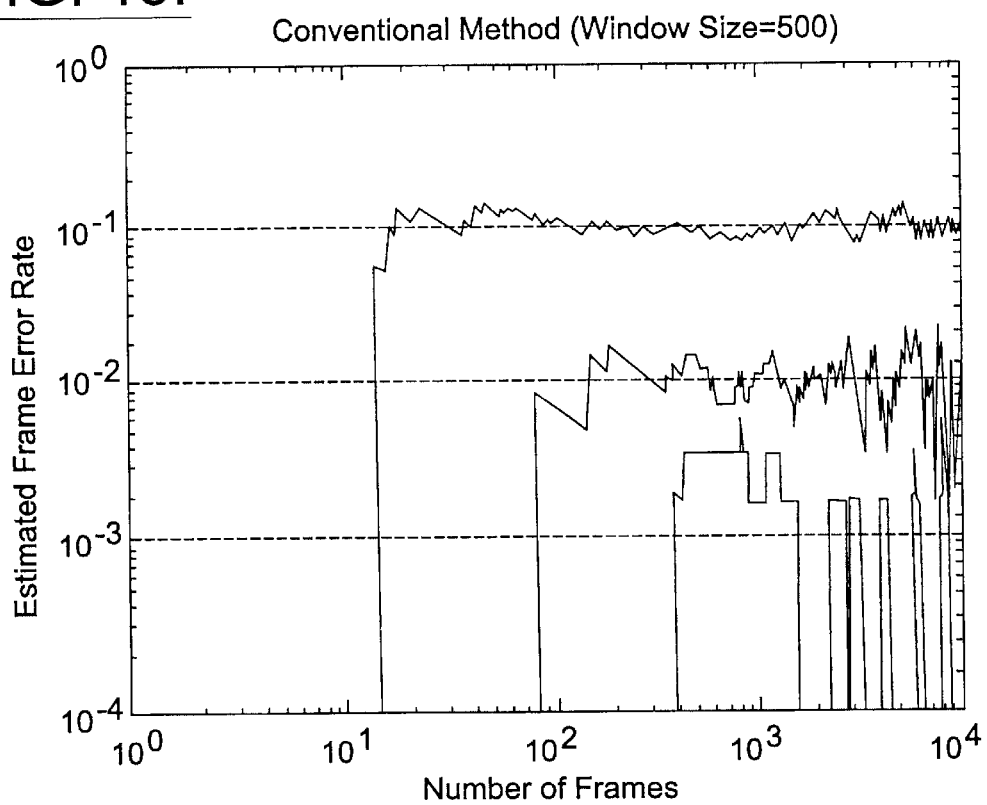
Figure 14:
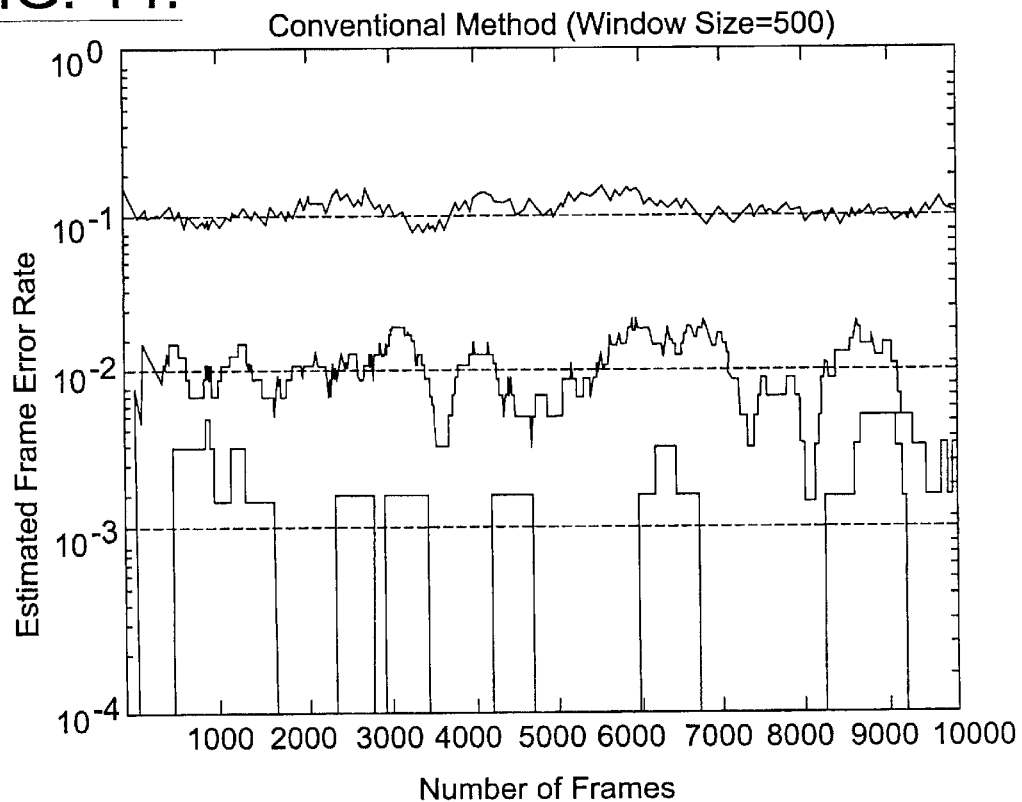

The window size for conventional error estimation in a conventional receiver was increased to 500 frames in the simulation illustrated in FIGS. 13 and 14. With this increase in window size, a conventional receiver, including conventional error estimation, may be able to improve long term estimates of frame error rate for actual FER=1%. The estimate at actual FER=1% using a 500 frame window size, however, is still less reliable than the estimate provided according to the present invention using a smaller window size of 100 frames as shown in FIG. 10. Moreover, conventional error estimation using a window of 500 frames may still be unable to provide a reliable estimation of the frame error rate when the actual FER=0.1%.

Figure 15:
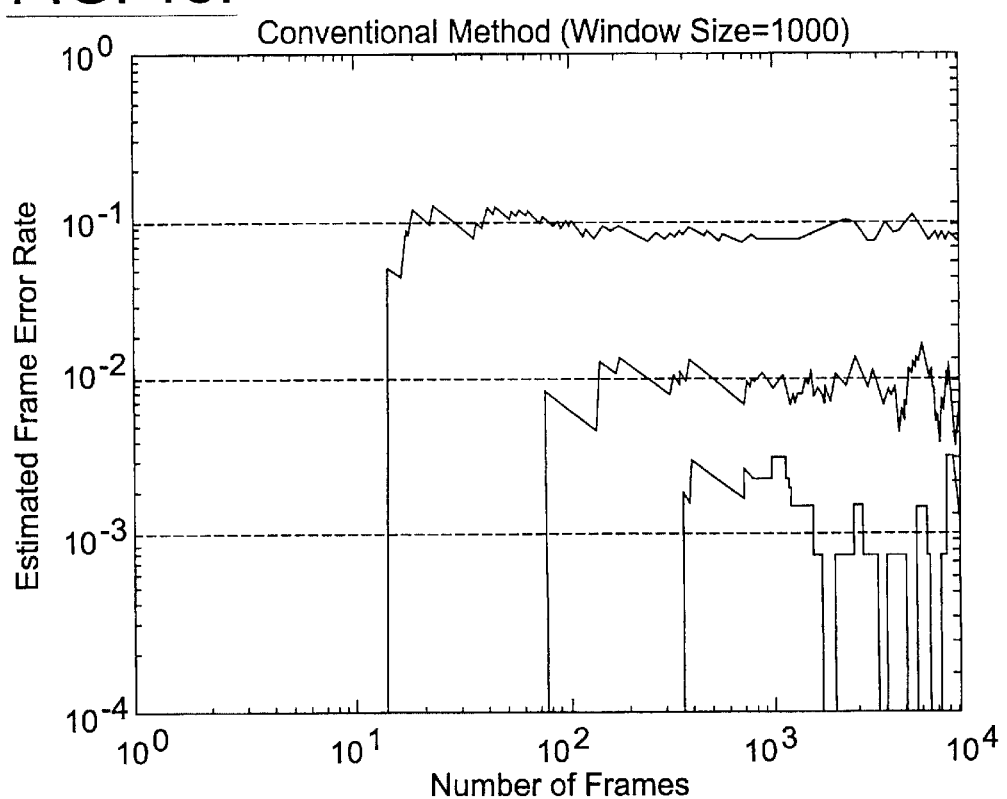
Figure 16:
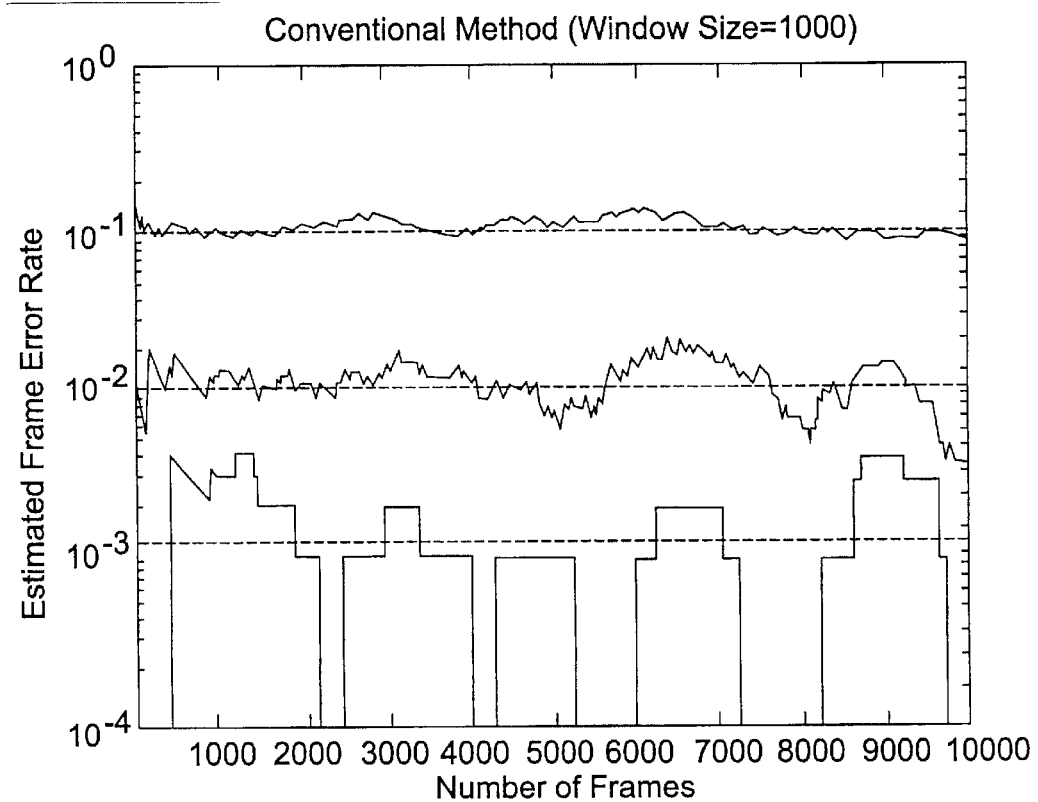

The window size for the conventional error estimation was further increased to 1000 frames in the simulation illustrated in FIGS. 15 and 16. Reliable estimates of the frame error rate for actual FER=10% and 1% were obtained as shown. Estimates of the frame error rate for actual FER=0.1%, however, still fail to provide continuously reliable results in this simulation.

Figure 17:
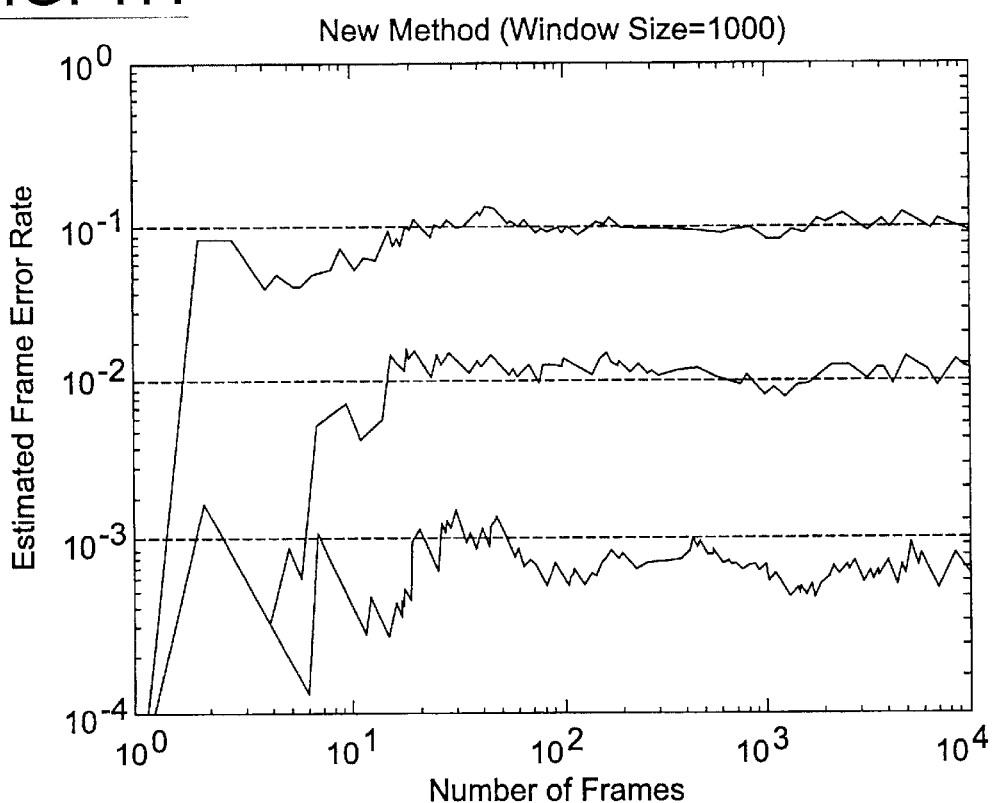
Figure 18:
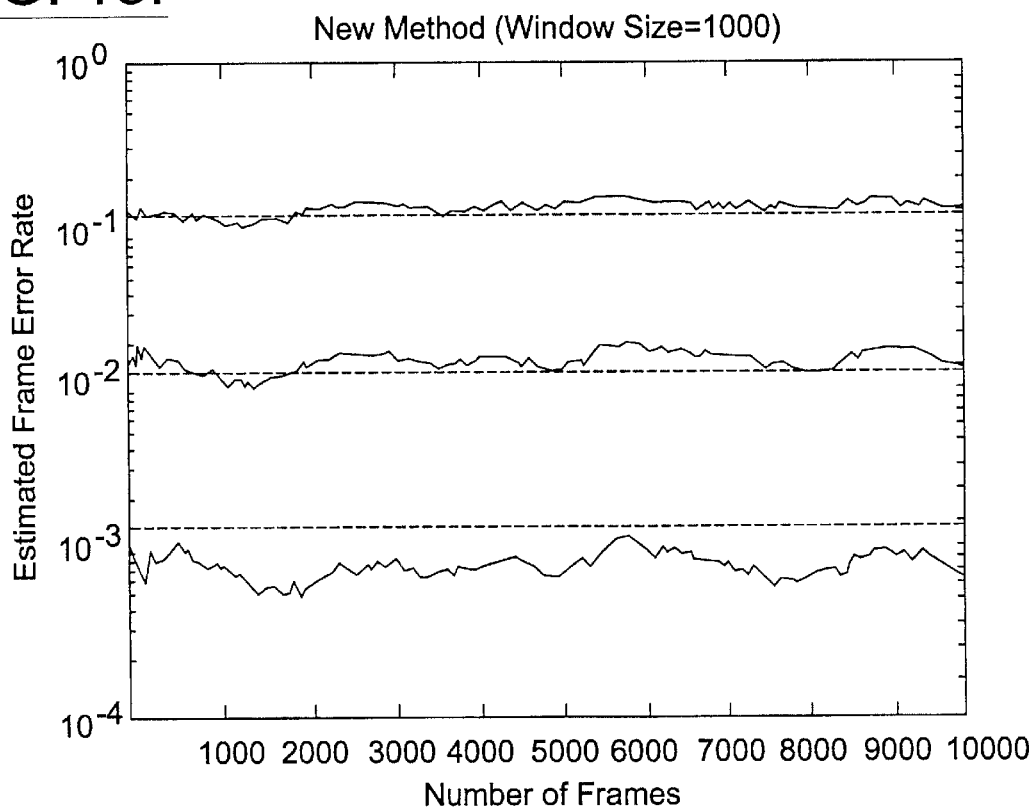

FIGS. 17 and 18 illustrate simulations for a WCDMA turbo code receiver (using Log-Max decoder and frame size K=640 with sliding window averaging) according to embodiments of the present invention performed with three constant operating $E_b/N_0$ and frame error rates, and performed with an increased sliding window averaging size L of 1000 frames. As shown, more reliable long term estimates of the frame error rates can be provided when compared to simulations according to embodiments of the present invention using a sliding averaging window size L of 100 frames as shown in FIGS. 9 and 10. As discussed above with regard to FIGS. 9 and 10, a consistent underestimation of the frame error rate when actual FER=0.01 is observed, and this under estimation may result from a lack of sufficient sampling resolution in this range of the interpolation table of FIG. 7. Underestimation may be reduced by providing a greater resolution of samples for this portion of the interpolation table of FIG. 7 with relatively low frame error rates and relatively low average numbers of iterations used to process received symbol sequences.

Figure 19:
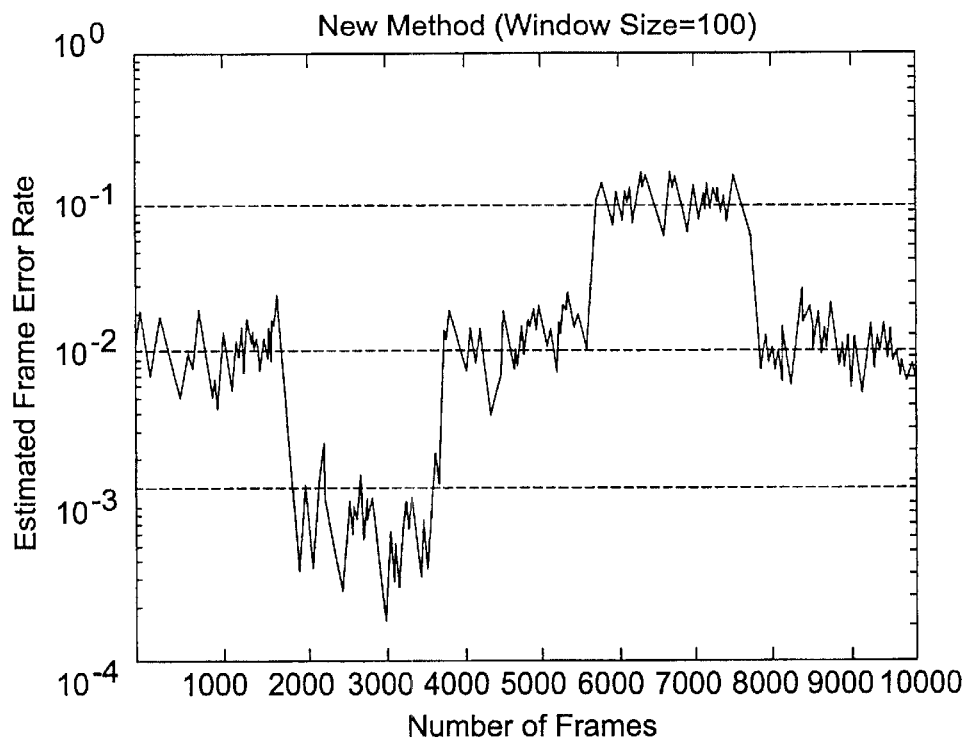

FIG. 19 illustrates simulation results for a WCDMA turbo code receiver (using Log-Max decoder and frame size K=640 with sliding window averaging) according to embodiments of the present invention performed while varying operating $E_b/N_0$ and frame error rates, and performed with a sliding window averaging size L of 100 frames. In particular, frames 1–2000, 4001–6000, and 8001–10000 are received with actual FER=1%; frames 2001–4000 are received with actual FER=0.1%; and frames 6001–8000 are received with actual FER=10%. As shown, the error estimator according to embodiments of the present invention tracks the operating FER both responsively and reliably.

Figure 20:
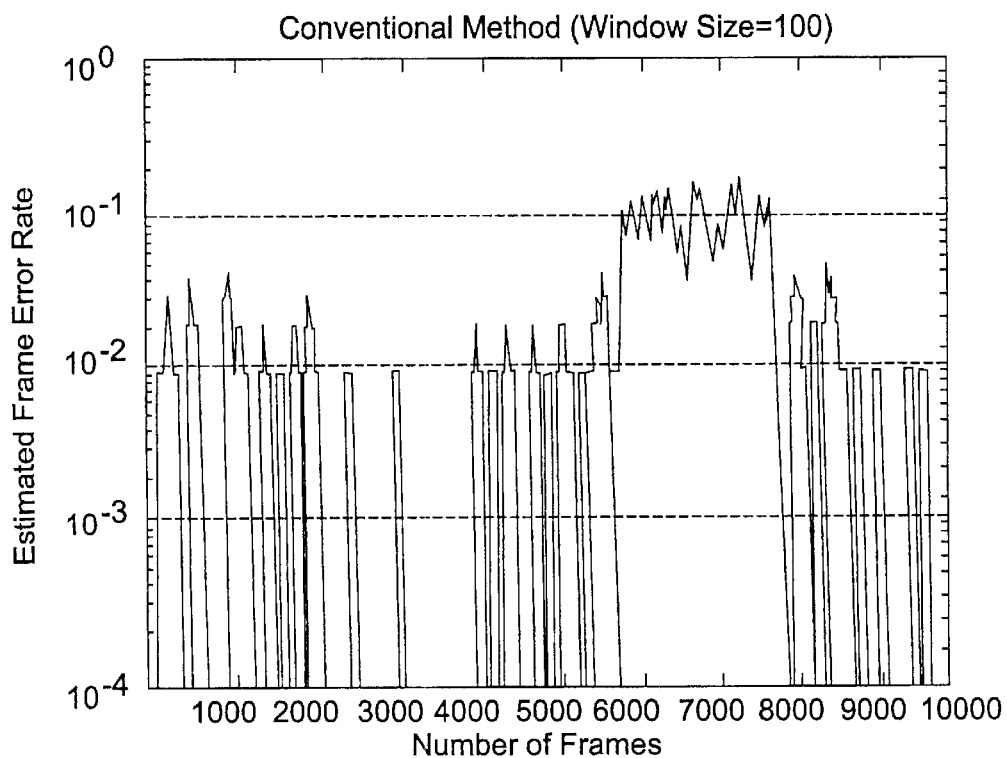
Figure 21:
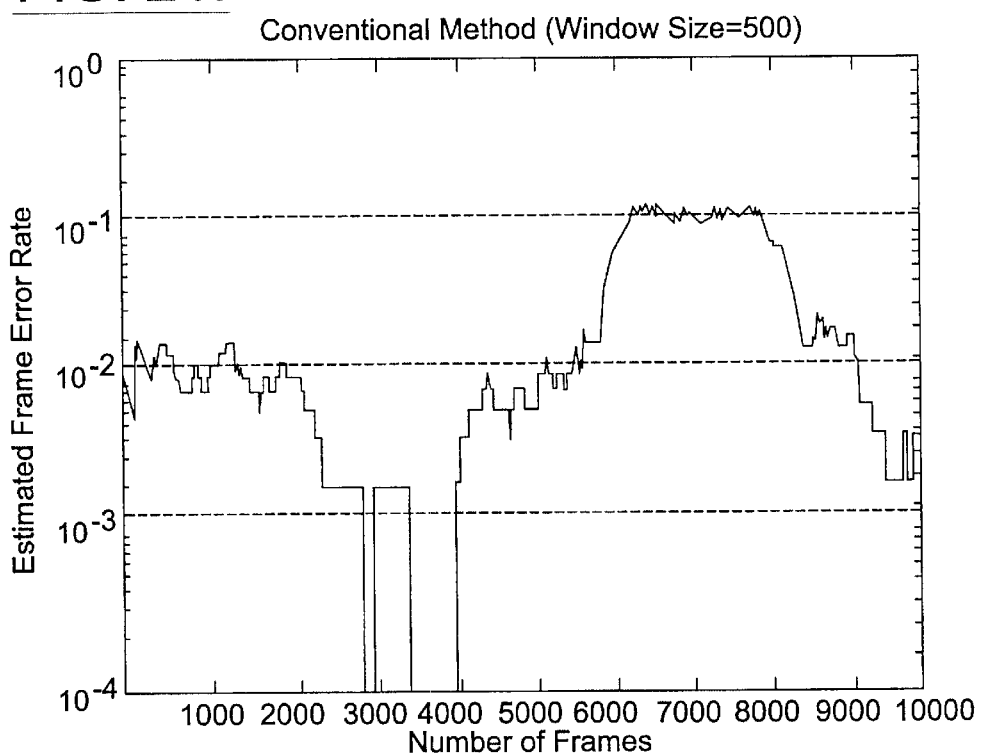
Figure 22:
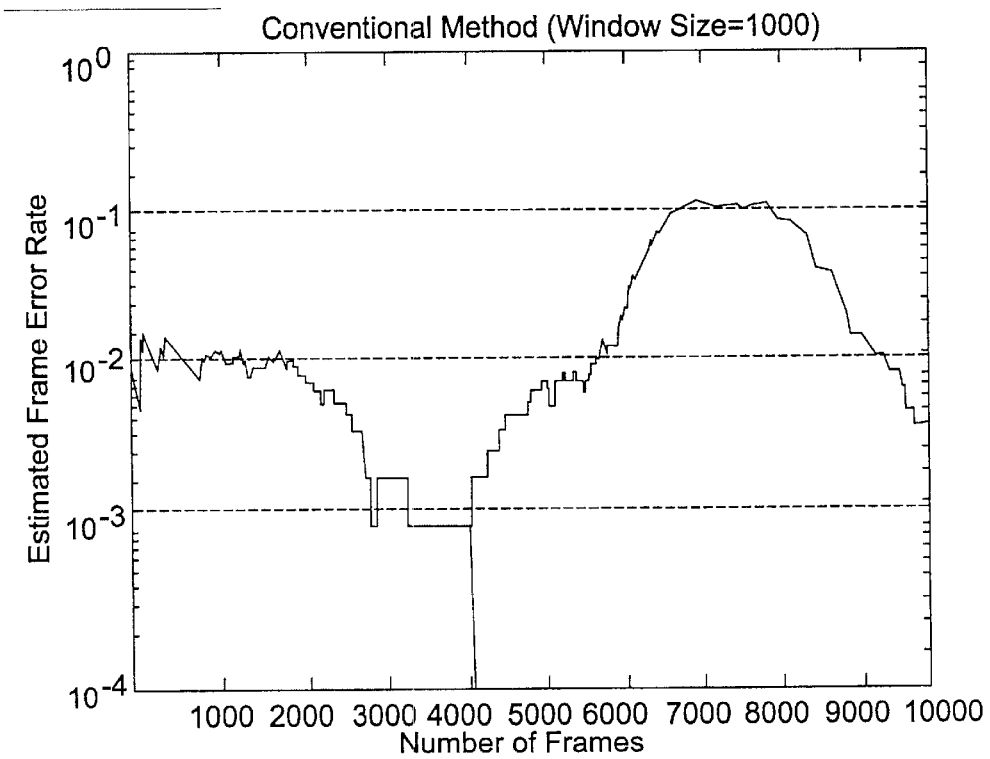

FIGS. 20–22 illustrate simulation results for a conventional receiver subjected to the same varying operating FER as discussed above with regard to FIG. 19 and using respective window sizes of 100, 500, and 1000 frames. In other words, the estimate of the frame error rate is conventionally calculated by observing the most recent 100, 500, or 1000 frames, counting the number of frame errors, and dividing the number of frame errors by the number of frames observed. As shown, conventional error estimation does not provide reliable estimates for varying operating frame error rates. The simulation of FIG. 20, at a relatively low window size of 100 frames, does not provide reliable estimates of the lower operating frame error rates where actual FER=1% and 0.1%. The simulations of FIGS. 21 and 22, at higher window sizes of 500 and 1000, do not adapt rapidly to changes in the operating frame error rate.

As discussed above, a receiver according to embodiments of the present invention may, thus, generate an estimate of an error rate for received communications using a number of iterative baseband processor iterations performed in the calculation of data frames. The use of iterative baseband processor iterations to generate estimates of an error rate can provide a reliable estimate that adapts rapidly to changing reception conditions. These error estimations can then be transmitted to the radio device transmitting received communications, thereby allowing the remote radio device, for example, to alter transmission characteristics, such as transmission power, to maintain a desired level of reception quality at the receiver. Alternately, or in addition, the error estimates can be used by the receiver with or without transmitting the error estimates to another radio device.

Figure 23:
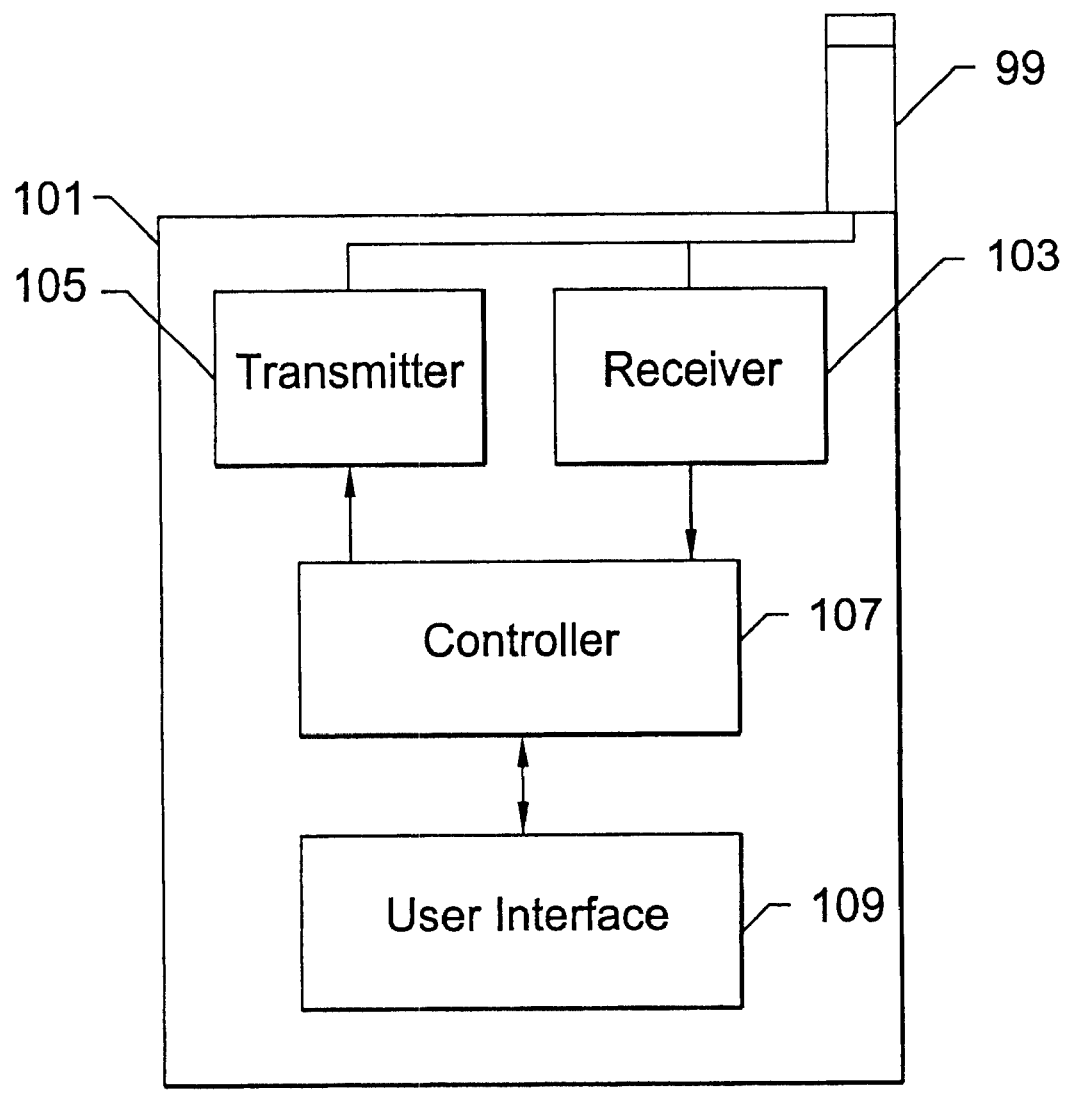
FIG. 23 is a block diagram illustrating a mobile terminal according to the present invention.

Receivers according to the present invention can be used in communications devices such as the mobile terminal 101 illustrated in FIG. 23 wherein the mobile terminal 101 provides communications with a base station. As shown, the mobile terminal can include an antenna 99, a receiver 103, a transmitter 105, a controller 107, and a user interface 109 where the user interface can include a keypad, a display, a speaker, and/or a microphone. In particular, the receiver 103 can be implemented as either the receiver of FIG. 1 or FIG. 2, and the information bits and error estimate generated by the receiver 103 can be provided to the controller 107. The controller 107 can, thus, provide the error estimate to the transmitter 105 for transmission back to the base station. The mobile terminal 101 can thus generate an error estimate for communications received from a base station, and transmit the error estimate back to the base station.

The mobile terminal 101, for example, can be a radiotelephone, a personal digital assistant, a computer with a wireless modem, or any other device providing voice and/or data communications. Moreover, receivers according to the present invention can be used, for example, in fixed terminals, communications base stations, satellite receivers, or pagers.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of estimating an error rate for received communications, the method comprising:

iteratively processing each of a plurality of received symbol sequences to provide a respective plurality of data sequences;

providing a number of iterations performed to provide each of the plurality of data sequences; and estimating an error rate for the received communications based on the number of iterations performed to provide each of the plurality of data sequences.

2. A method according to claim 1 wherein estimating the error rate comprises calculating an average of the number of iterations performed to provide each of the plurality of data sequences so that the error rate is based on the average of the numbers of iterations performed.

3. A method according to claim 2 further comprising:

providing a lookup table including candidate averages of iterations performed and a corresponding estimated error rate for each of the candidate averages wherein estimating the error rate further comprises selecting an estimated error from the lookup table corresponding to the calculated average.

4. A method according to claim 1 wherein iteratively processing each of a plurality of received symbol sequences comprises:

iteratively processing a received symbol sequence to provide an estimated data sequence after each iteration;

performing an error check on an estimated data sequence after each iteration;

performing subsequent iterative processing of the received symbol sequence responsive to detecting an error during the error check; and terminating subsequent iterative processing of the received symbol sequence and transmitting the estimated data sequence as the data sequence responsive to detecting no error during the error check.

5. A method according to claim 4 wherein performing an error check comprises performing a cyclic redundancy check (CRC).

6. A method according to claim 1 wherein the estimated error rate comprises an estimated bit error rate.

7. A method according to claim 1 wherein the data sequence comprises a data frame and the estimated error rate comprises an estimated frame error rate. estimated frame error rate.

8. A method according to claim 1, wherein estimating an error rate comprises estimating an error rate for the received communications based on a correlation between the error rate and the number of iterations performed to provide each of the plurality of data sequences.

9. A method according to claim 2, further comprising:

varying transmission power responsive to the estimated error rate for the received communications based on the average number of iterations performed.

10. A receiver comprising:

means for receiving a plurality of received symbol sequences;

means for iteratively processing each of the plurality of received symbol sequences to provide a respective plurality of data sequences;

means for providing a number of iterations performed to provide each of the plurality of data sequences; and means for estimating an error rate for received communications based on the number of iterations performed to provide each of the plurality of data sequences.

11. A receiver according to claim 10 wherein the means for estimating the error rate comprises means for calculating an average of the number of iterations performed to provide each of the plurality of data sequences so that the error rate is based on the average of the numbers of iterations performed.

12. A receiver according to claim 11 further comprising:

means for providing a lookup table including candidate averages of iterations performed and a corresponding estimated error rate for each of the candidate averages wherein the means for estimating the error rate further comprises means for selecting an estimated error from the lookup table corresponding to the calculated average.

13. A receiver according to claim 11, further comprising:

means for varying transmission power responsive to the estimated error rate for the received communications based on the average number of iterations performed.

14. A receiver according to claim 10, wherein the means for iteratively processing each of a plurality of received symbol sequences comprises:

means for iteratively processing a received symbol sequence to provide an estimated data sequence after each iteration;

means for performing an error check on the estimated data sequence after each iteration;

means for performing subsequent iterative processing of the received symbol sequence responsive to detecting an error during the error check; and means for terminating subsequent iterative processing of the received symbol sequence and transmitting the estimated data sequence as the data sequence responsive to detecting no error during the error check.

15. A receiver according to claim 14 wherein the means for performing an error check comprises means for performing a cyclic redundancy check (CRC).

16. A receiver according to claim 10 wherein the estimated error rate comprises an estimated bit error rate.

17. A receiver according to claim 10 wherein the data sequence comprises a data frame and the estimated error rate comprises an estimated frame error rate.

18. A receiver according to claim 10, wherein means for estimating an error rate further comprises means for estimating an error rate for received communications based on a correlation between the error rate and the number of iterations performed to provide each of the plurality of data sequences.

19. A receiver comprising:

a radio processor that generates a plurality of receive symbol sequences;

an iterative baseband processor coupled to the radio processor wherein the iterative baseband processor iteratively processes each of a plurality of received symbol sequences to provide a respective plurality of data sequences;

a detection circuit coupled to the iterative baseband processor wherein the detection circuit provides a number of iterations performed to provide each of the plurality of data sequences; and an error estimator coupled to the detection circuit wherein the error estimator estimates an error rate for received communications based on the number of iterations performed to provide each of the plurality of data sequences.

20. A receiver according to claim 19 wherein the error estimator is further configured to calculate an average of the number of iterations performed to provide each of the plurality of data sequences to provide the error rate based on the average of the numbers of iterations performed.

21. A receiver according to claim 20 further comprising:

a lookup table including candidate averages of iterations performed and a corresponding estimated error rate for each of the candidate averages wherein the error estimator selects an estimated error from the lookup table corresponding to the calculated average.

22. A receiver according to claim 20 wherein the receiver provides information to vary transmission power responsive to the estimated error rate for the received communications based on the average number of iterations performed.

23. A receiver according to claim 19 wherein the iterative baseband processor is further configured to iteratively process a received symbol sequence to provide an estimated data sequence after each iteration, wherein the detection circuit is further configured to perform an error check on the estimated data sequence after each iteration, wherein the iterative baseband processor performs subsequent iterative processing of the received symbol sequence in response to detecting an error during the error check, and wherein the iterative baseband processor terminates subsequent iterative processing of the received symbol sequence and transmits the estimated data sequence as the data sequence responsive to detecting no error during the error check.

24. A receiver according to claim 23 wherein the detection circuit comprises a cyclic redundancy check (CRC) circuit.

25. A receiver according to claim 19 wherein the estimated error rate comprises an estimated bit error rate.

26. A receiver according to claim 19 wherein the data sequence comprises a data frame and the estimated error rate comprises an estimated frame error rate.

27. A receiver according to claim 19, wherein the error estimator estimates an error rate for received communications based on a correlation between the error rate and the number of iterations performed to provide each of the plurality of data sequences.

* * * * *